(12) United States Patent
Gibson

(10) Patent No.: US 6,325,932 B1
(45) Date of Patent: Dec. 4, 2001

(54) APPARATUS AND METHOD FOR PUMPING HIGH VISCOSITY FLUID

(75) Inventor: Gregory M. Gibson, Dallas, TX (US)

(73) Assignee: Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/451,498

(22) Filed: Nov. 30, 1999

(51) Int. Cl.[7] .................................. B01D 29/60; F04F 1/12
(52) U.S. Cl. ..................... 210/416.1; 210/120; 210/436; 222/189.06; 222/255; 417/244; 417/313; 417/473
(58) Field of Search .................... 210/767, 257.1, 210/258, 260, 261, 416.1, 416.4, 416.5, 420, 424, 472, 436; 222/1, 23, 189.06, 255; 417/2, 7, 244, 246, 253, 313, 383, 388, 395, 413.1, 426, 472, 473

(56) References Cited

U.S. PATENT DOCUMENTS

| | | | |
|---|---|---|---|
| 2,215,505 | * 9/1940 | Hollander | 417/426 |
| 2,631,538 | * 3/1953 | Johnson | 417/244 |
| 3,227,279 | * 1/1966 | Bockelman | 210/416.1 |
| 3,741,298 | * 6/1973 | Canton | 417/426 |
| 4,950,134 | 8/1990 | Bailey et al. | |
| 5,061,156 | 10/1991 | Kuehne et al. | |
| 5,167,837 | * 12/1992 | Snodgrass et al. | 417/426 |
| 5,261,442 | 11/1993 | Kingsford et al. | |
| 5,262,068 | * 11/1993 | Bowers et al. | 210/767 |
| 5,380,019 | 1/1995 | Hillery et al. | |
| 5,476,004 | 12/1995 | Kingsford | |
| 5,490,765 | * 2/1996 | Bailey et al. | 210/416.1 |
| 5,511,797 | 4/1996 | Nikirk et al. | |
| 5,516,429 | 5/1996 | Snodgrass et al. | |
| 5,527,161 | 6/1996 | Bailey et al. | |
| 5,575,311 | 11/1996 | Kingsford | |
| 5,580,103 | 12/1996 | Hall | |
| 5,645,301 | 7/1997 | Kingsford et al. | |
| 5,652,391 | 7/1997 | Kingsford et al. | |
| 5,762,795 | 6/1998 | Bailey et al. | |
| 5,772,899 | 6/1998 | Snodgrass et al. | |
| 5,971,723 | * 10/1999 | Bolt et al. | 417/413.1 |
| 6,105,829 | * 8/2000 | Snodgrass et al. | 222/214 |
| 6,190,565 | * 2/2001 | Bailey et al. | 210/767 |
| 6,238,576 | * 5/2001 | Yajima | 210/767 |
| 6,250,502 | * 6/2001 | Cote et al. | 222/1 |
| 6,251,293 | * 6/2001 | Snodgrass et al. | 210/767 |

FOREIGN PATENT DOCUMENTS 892204   1/1999   (EP) .

OTHER PUBLICATIONS

Author Unknown, "Chempure Pump, A Furon Product, With Pulse Dampener", brochure (copyright 1996, Furon Company), two (2) pages, Furon, 3340 East La Palma Avenue, Anaheim, California 92806.

* cited by examiner

Primary Examiner—Joseph W. Drodge
(74) Attorney, Agent, or Firm—J. Mark Holland & Associates

(57) ABSTRACT

A system for dispensing and filtering fluid is disclosed, in which the fluid flow path is substantially vertical from the fluid inlet through fluid dispense. Substantially all wetted surfaces are Teflon® or some similar non-contaminating fluid, for applications such as cleanroom processes. A valve and a filter chamber are incorporated into a pump head to simplify the flow path and reduce potential contamination points. Preferred methods, and chips or other microelectronic devices fabricated from the apparatus or methods, are also disclosed.

27 Claims, 12 Drawing Sheets

APPARATUS AND METHOD FOR PUMPING HIGH VISCOSITY FLUID

The present invention relates to pumps for precisely dispensing fluids and methods related thereto, as well as various products made by those pumps and methods.

BACKGROUND OF THE INVENTION

This invention relates to a pumping system useful in dispensing fluids, especially those that are expensive, viscous, high purity, and/or sensitive to molecular shear. The invention also relates to microelectronic components such as silicon chips and wafers, microelectronic substrates, and circuits fabricated by such pumping systems and methods, including the potentially improved quality and yield of such products achievable with the invention as compared to prior art systems.

General aspects of the relevant background of the invention are discussed in prior U.S. Pat. Nos. 5,167,837; 5,772,899; and 5,516,429. Among other things, the invention has numerous applications, but is especially useful in the microelectronics industry. The trend in that industry continues to be to squeeze greater quantities of circuitry onto smaller substrates. Circuit geometries continue to shrink, the use of expensive materials continues, and the corresponding need for decontaminated "cleanroom" environments and equipment for manufacturing, filtering, and processing continues and even increases. Perhaps as importantly, the need for improved yield of final product continues, for economic and other reasons.

The equipment and methods of the aforementioned U.S. Pat. Nos. 5,167,837; 5,772,899; and 5,516,429 addresses many situations and applications very well. The present invention is directed to further improvements in that technology, as well as potential applications of such improvements in unrelated technologies.

Among other things, further simplification and upright orientation of the flow path for the processed fluids through a pumping and dispensing system can reduce the risk of contamination, air entrapment, or similar concerns, while providing similar or improved reliability and precise control for desired filtration, dispense, and other handling of the process fluids. Further manufacturing and design improvements in the instant invention allow the entire process fluid flow path to be coated or machined from Teflon® or some similar non-contaminating material, further reducing the likelihood of any contamination problems.

As indicated above, many problems were addressed and solved by the aforementioned U.S. Pat. Nos. 5,167,837, 5,516,429, and 5,772,899. Among other things, those devices introduced a diaphragm-type fluid dispense system which, in certain embodiments, included two separate computer-controlled pumps to dispense precise amounts of fluid. However, the preferred embodiments in those patents show the process fluid traveling in a somewhat meandering path through the pump system. In certain applications, that path does not afford optimal venting for any contaminating air bubbles that may become entrapped in the fluid or the system. For example, some small amount of air bubbles may be unavoidably introduced when the source fluid container is periodically changed, even if no re-priming is required. Portions of the flow path that are metal or otherwise relatively potentially contaminating result in some risk (however small) of corresponding undesirable contamination of the fluid.

As indicated in those prior patents, such bubbles or contaminants could potentially compromise the end product to some degree in some small percentage of applications. Alternatively, such bubbles or contaminants might require some period of "flushing" bubbles from the system upon changing the source fluid container, for example, or might otherwise compromise the accuracy of the fluid dispense system (again, in a small percentage of applications and situations). Although those prior patents and inventions function well in that regard and are a dramatic advance over the prior art before them, and although those prior patents can be readily adapted to deal with the aforementioned potential problems, the instant invention provides improvements in that regard.

Other benefits derive from simplifying the flow path of the fluid. By simplifying and reducing the number of components involved in the system, assembly and maintenance can be correspondingly simplified. Perhaps more importantly, the number of connection points, seals, fittings, and related potential leak-spots can be reduced, thereby directly reducing the risk of contamination, air-entrainment, or similar problems. Additionally, reducing and realigning the fluid flow path can reduce the size of the "footprint" for the housing of the system and otherwise make the system more compact as compared to prior art systems, thereby correspondingly reducing valuable factory space for the users of the pump system.

OBJECTS AND ADVANTAGES OF THE INVENTION

It is, therefore, an object of my invention to provide a fluid dispensing system that provides the improved performance and benefits discussed herein. The system is characterized by substantially vertical fluid flow from its inlet to its outlet when the system is in its normally upright position, and by providing Teflon® or similar non-contaminating wetted surfaces throughout the flowpath. In its preferred embodiment, the flow path is simplified as compared to prior art systems, including fewer fittings and connections (in part resulting from integrally forming various components into single unitary structures).

A further object of the invention is the provision of a device for processing fluid in a precisely controlled manner, including the combination of first pumping means and second pumping means in fluid communication with each other, in which the fluid travel path that is substantially consistently upward as the fluid flows through the first pumping means and the second pumping means. As indicated above, the first and second pumping means surfaces that contact the fluid are preferably all fabricated from or coated with a relatively non-contaminating material, such as Teflon® or the like. Among other things, this facilitates using the system for high-purity fluids, in cleanroom environments, etc.

The device can further include filter means between the first pumping means and the second pumping means, in which case the fluid travel path preferably remains substantially consistently upward as the fluid flows through the first pumping means, the filter means, and the second pumping means, and all or substantially all contacting surfaces are non-contaminating. In the preferred embodiment, the pump head and the valve therein are actually fabricated from Teflon®, and all fittings along the flow path are flare fittings formed from Teflon® or otherwise having wetted surfaces that are non-contaminating to the subject fluid. For the non-contaminating aspect of the invention, the particular material may be any suitable non-contaminating material, including without limitation various forms of Teflon® (TFE & PFA), Kalrez (a fluorinated, Teflon® -like elastomer), or other materials. Among the many suitable fittings usable in the invention, commercially available Furon Flare Grip® PFA tube fittings can be readily utilized.

Another object of the invention is the provision of a system or device of the aforementioned character, in which the first pumping means includes an upper head portion removable from a lower portion, and means are provided for temporarily attaching the upper head portion to a lower portion to form a pumping chamber therebetween. Preferably, the upper head portion includes integrally formed valve means configured to thereafter direct the process fluid in a substantially upward path toward a filter chamber integrally formed in the upper head portion. Among other things, the integral valve facilitates filtering viscous and other fluids under relatively low pressure, and decreases molecular shear on the fluids, in part by providing relatively larger and less obstructed flow paths through the valve (as compared to prior art systems). The valve also reduces differential pressure, or pressure drop, as the fluids move through the valve.

An additional object of the invention is the provision of a system or device of the aforementioned character, in which the second pumping means includes an upper head portion removable from a lower portion, with means for temporarily attaching the upper head portion to the lower portion to form a pumping chamber therebetween. Again preferably, the upper head portion of the second pumping means includes an integrally formed tee fluid flowpath therein, wherein the tee provides a substantially direct upward flowpath for the subject fluid from the pumping chamber toward a dispense from the upper head portion. The preferred tee includes an input portion for receiving the subject fluid after it has been pumped by the first pumping means, and the dispense from the second pump's upper head portion is positioned higher than the input portion when the device is in its normal, upright orientation.

A further object of the invention is the provision of a system or device of the aforementioned character, in which the second pumping means is positioned generally above the first pumping means, and the fluid travel path from an exit of the first pumping means to an inlet into the second pumping means does not include any downwardly directed portions when the device is in its normal, upright orientation.

A still further object of the invention is the provision of a device for dispensing fluid, including the combination of a first diaphragm-type pump having a pumping head, the head including an integrally formed valve to control flow of fluid into the first diaphragm-type pump. The device can further include a second diaphragm-type pump positioned generally above the first diaphragm-type pump and configured to receive fluid pumped by the first diaphragm-type pump, and having a fluid path from the first diaphragm-type pump to the second diaphragm-type pump that is generally upward.

Yet another object of the invention is the inclusion of a vent valve above or upstream of the filter to permit selective venting of any gas entrained in the subject fluid. Preferably, the vent valve can also function as a pressure relief or safety valve, to prevent the pressure on the subject fluid and the system itself from exceeding a selected level. Also preferably, the vent valve is positioned at a high point within the filter chamber.

Other objects of the invention are directed to a method for filtering and dispensing fluid, including one or more of the steps of providing a valve means integrally formed in an upper head of a first pumping member, the valve means configured to receive the subject fluid and direct it in a substantially upward path from the first pumping member; actuating the first pumping member to draw the subject fluid from a source; and further actuating the first pumping member to dispense the subject fluid upwardly from the first pumping member. In the preferred embodiment, the valve switches the fluid flow drawing and dispensing steps in the preceding sentence. As indicated above, the steps can further include providing a filter chamber integrally formed in the upper head of the first pumping member and providing a substantially direct upward flow path within the upper head from the first pumping member through the valve means to the filter chamber, whereby further actuation of the first pumping member directs the subject fluid upwardly from the first pumping member to the filter chamber.

Additional steps of the methods of the invention include providing a second pumping member substantially above the first pumping member and providing fluid flow means therebetween, whereby the subject fluid does not flow downwardly between the first pumping member and the second pumping member; and pumping the subject fluid along the non-downward flowpath.

Another object of the invention is the provision of apparatus and methods that include providing a valve downstream of the second pumping member for selectively dispensing the subject fluid or returning the subject fluid to the source, in which the downstream valve is a substantially zero displacement valve that does not undesirably contaminate or introduce gas into the subject fluid. Among other things, the preferred valve reduces or eliminates the likelihood that operating the valve will displace fluid (such as displacing it from the dispense line), which displacement could adversely affect the accuracy of dispense or other aspects or performance of the system.

Although the invention is described herein in connection with dispense of high-purity, viscous fluids, the invention may be utilized in many other applications. Moreover, although the preferred embodiment discussed herein includes two pumping means with filter means interposed therebetween, advantageous aspects of the invention may be practiced with no filter means, or with only one pumping means with or without filter means.

As with prior art systems, my invention provides a dispensing system permitting the use of computer or other automated digital control for the rate and interval of dispense, as well as for the direction of fluid flow through the system and fluid pressure during operation of the system. Thus, still another object of my invention is the provision of a dispensing system that permits great flexibility of operation, making it adaptable to numerous applications. The system may be controlled or driven by stepper or servomotors, or similar technology, and by various computer software, hardware, and wiring or wireless communication systems.

Other objects of my invention include providing a relatively shorter fluid flow path such that contaminants are less likely to be introduced, and a relatively more compact pump design that leaves a smaller "footprint" (as compared to prior art devices).

An additional object of the invention is the provision of integrated circuits, chips, or other microelectronic devices fabricated from the aforementioned apparatus or methods.

Other objects and advantages of the invention will be apparent from the following specification and the accompanying drawings, which are for the purpose of illustration only.

DESCRIPTION OF PREFERRED EMBODIMENT

Figure 1:
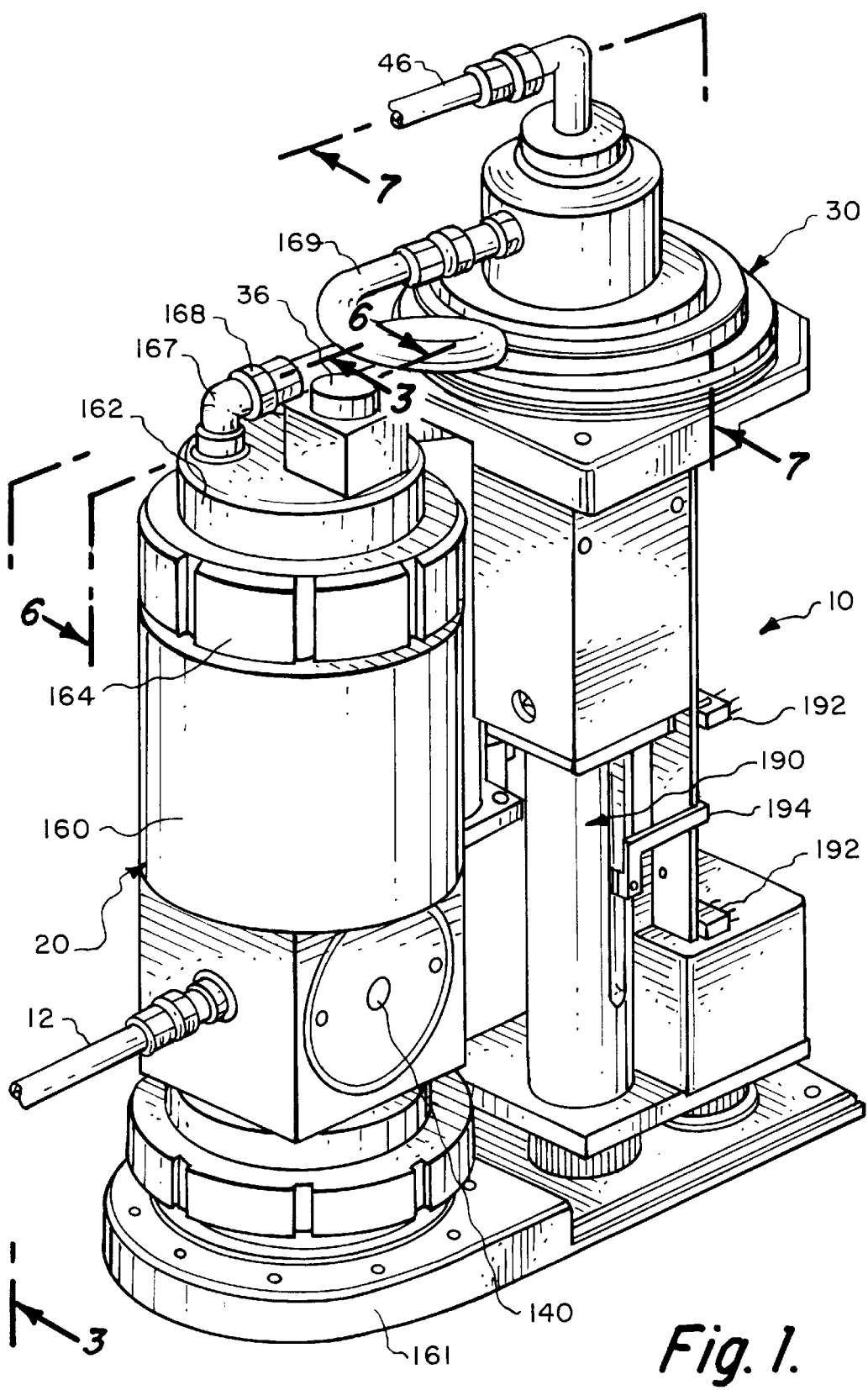
FIG. 1 is an isometric view of a preferred embodiment of the invention.
Figure 2:
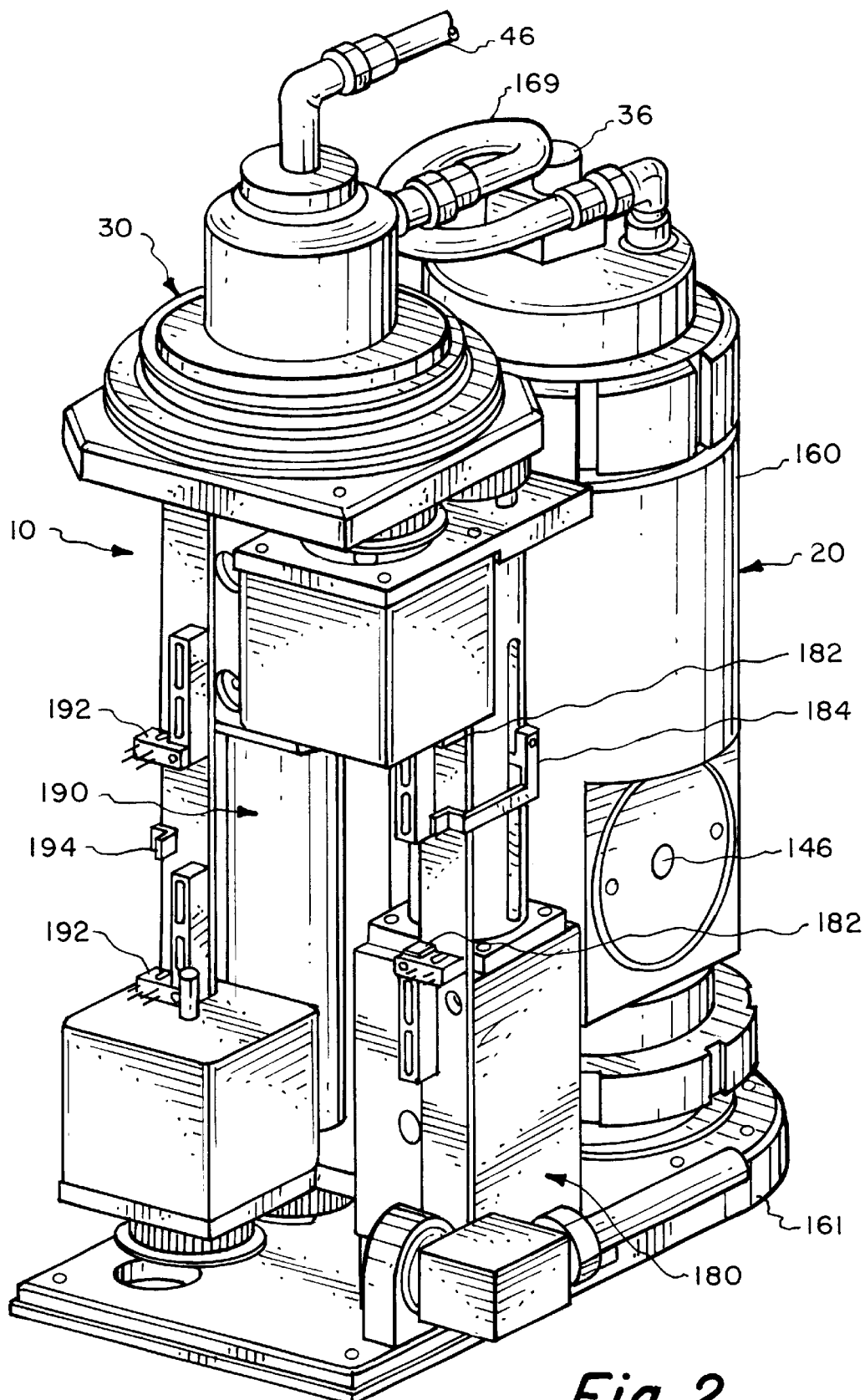
FIG. 2 is another isometric view of the same system, viewed from an opposite upper corner to illustrate the back side(s) of the assembly.

Referring now to the drawings, and particularly FIGS. 1 and 2, I show a preferred embodiment of a pump and dispense system 10 constructed in accordance with the teachings of the invention. Preferably, the system includes a first pumping means or master pump 20, and a second pumping means or slave pump 30, operably connected to pump fluid from an inlet 12 to an outlet 46. As described herein, filtering means can be included between the master and slave pumps 20 and 30, or preferably within the master pump 20 (as described herein), to filter the process fluid.

Figure 8:
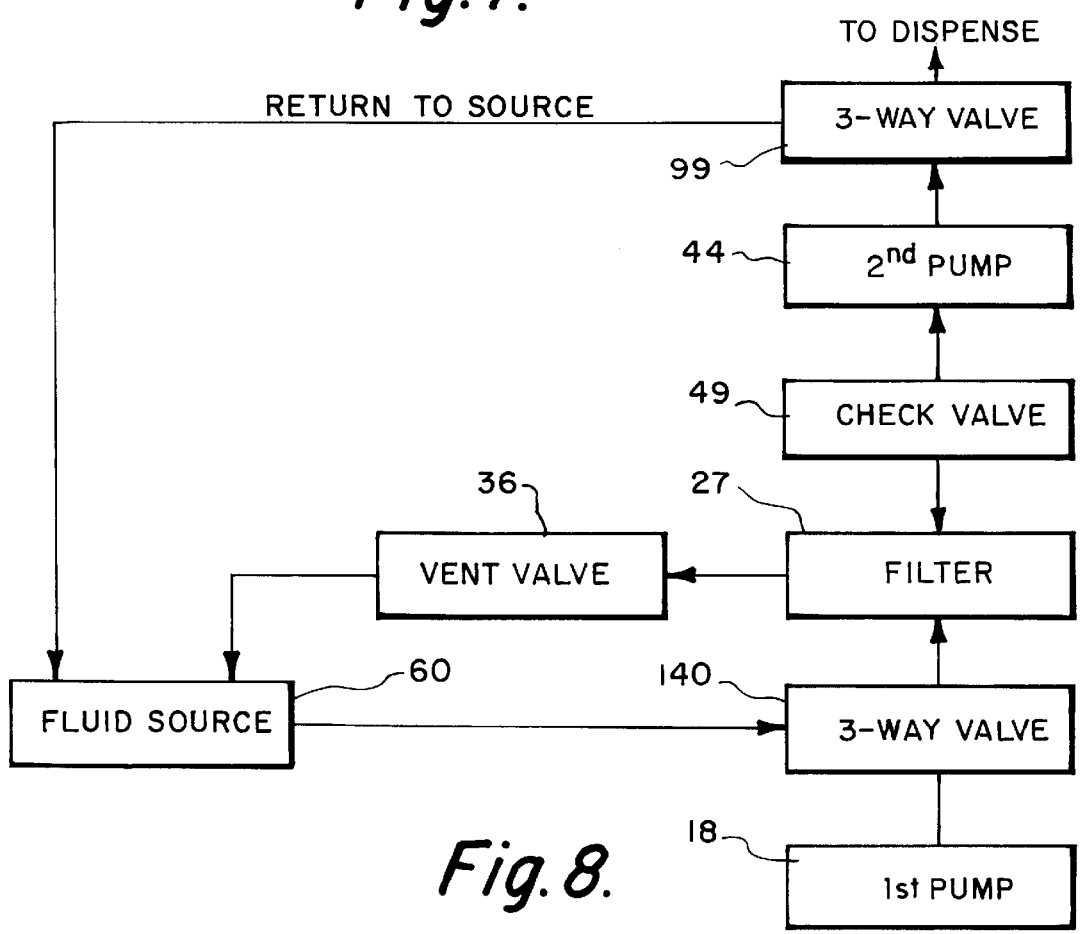
FIG. 8 is a flow chart generally illustrating a preferred method of operation of the invention.
Figure 9:
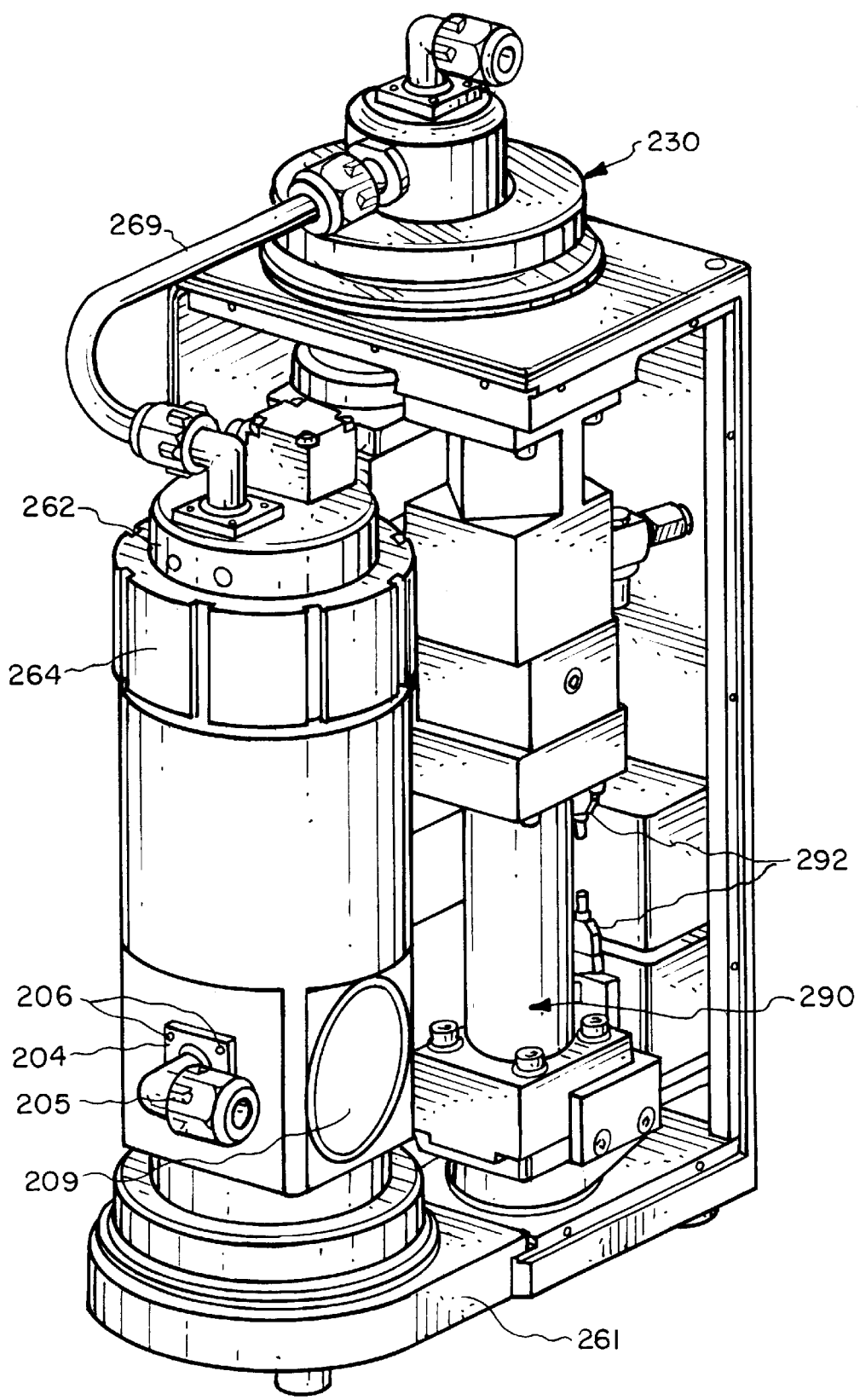
FIG. 9 is an isometric view similar to FIG. 1, but illustrates one of the many alternative embodiments of the invention.

General concepts regarding the components and operation of the preferred system and its pump mechanisms are disclosed in U.S. Pat. Nos. 5,167,837, 5,516,429, and 5,772,899, which are hereby incorporated herein by reference. An overview of a preferred method of operation of the present invention is illustrated in FIG. 8. Fluid taken from an initial fluid source 60 (FIG. 8) is drawn into the system 10 through the inlet 12, by operation of the master pump 20. As part of this process, an integral three-way valve 140 in the master pump is positioned to permit the subject fluid to be pulled into a diaphragm-style first pump 18 (by moving its diaphragm downwardly, as explained in the aforementioned patents). The valve 140 is then actuated to permit flow from pump 18 upwardly through valve 140 and eventually through a filter 27. One or more vent or check valves (such as vent valve 36 and check valve 49) can be included along the flowpath at appropriate locations, to vent undesirable entrained gas and to prevent undesirable backflow, as discussed further herein. The vent valve 36 can either return the fluid to the source 60 (as shown in FIG. 8) or to a waste drain (not shown). When exiting the filter other than via the vent valve 36, the fluid preferably travels to a second diaphragm-style pump 44, which preferably directs it to another three-way valve 99 (see FIG. 8; that valve 99 can be any suitable valve, such as the zero-displacement, non-contaminating valves described herein, and can be positioned at any suitable location, although it typically is remote from the second pump 44 so as to be adjacent the actual dispense and improve the ability to precisely control final dispense, dripping, suckback or the like). That second valve 99 can be selectively actuated to direct the flow back to the source 60 or to be dispensed on a substrate or other microelectronic chip or device-in-process (not shown).

Persons of ordinary skill in the art will understand that many of the general concepts disclosed in the aforementioned U.S. Pat. Nos. 5,167,837, 5,516,429, and 5,772,899 apply with equal cogency to this invention. Some of the important improvements over those prior art inventions are disclosed or described herein.

By way of example and not by way of limitation, the overall flow path for the subject fluid is preferably substantially upward as the fluid moves through the system 10 (obviously, however, if the fluid is directed by valve 99 back to the source, the fluid then returns "down" to its original level). This preferred upward flow path includes preferred positioning of the inlet 12 as low as practicable on the first pumping member 20. Preferably, the only "down" flow portions of the flow path occur as the fluid is drawn into the respective pumping chambers 18 and 44. Persons of ordinary skill in the art will understand that this "down" flow facilitates priming of the pumps and other beneficial performance and packaging of the system 10 (including facilitating practical packaging of the preferred hydraulics, diaphragm pumps, and pump heads and filters within a relatively small footprint), and that in any case the preferred substantially vertical alignment and configuration of the "downstream" components and elements adjacent each of those pumping chambers 18 and 44 minimizes any gas entrainment or related problems that might otherwise occur. For example, the preferred embodiment provides relatively vertical passages 22, 23 and 45 (see FIGS. 3 and 7) from uppermost respective regions of those pumping chambers 18 and 44, to a vent valve 36 (see FIG. 6) and to the exit of the second pump 46. Thus, in the preferred embodiment, any "downward" flow is immediately followed by an upward flow (via the diaphragm pump forcing the subject fluid in an upward direction), which helps to purge any entrained air and to continue the overall upward flow of the subject fluid.

Similarly by way of example and not by way of limitation, and as more fully explained herein, the overall flow path preferably includes fewer fittings than prior art systems, and those fittings and the flow path itself are preferably fabricated from or coated with Teflon® or similar materials, to further reduce the risk of any contamination of the process fluid. Preferably, and as indicated above, flare fittings such as commercially available Flare Grip® PFA tube fittings can be readily utilized.

Figure 3:
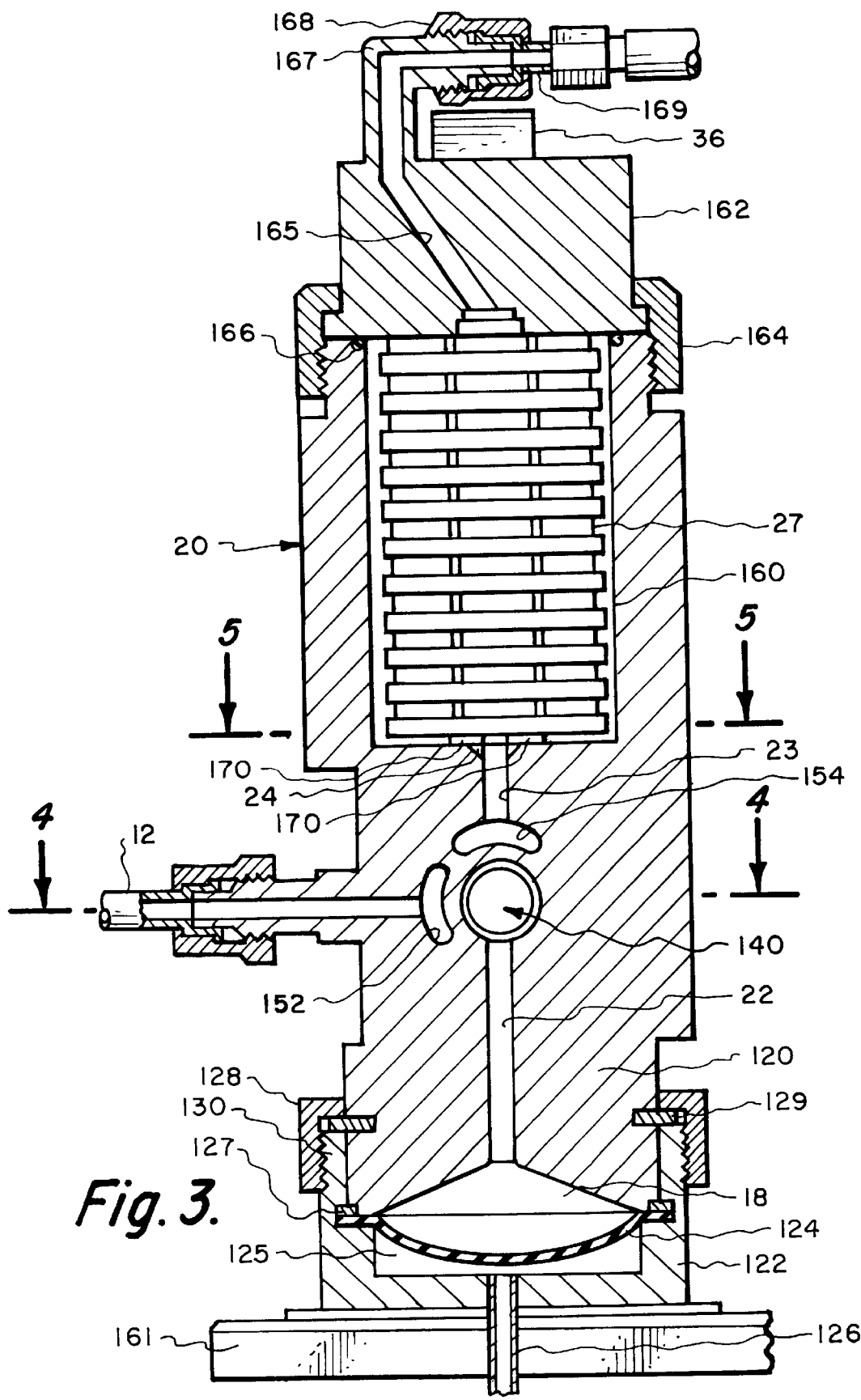
FIG. 3 is a cross-sectional view taken along line 3—3 of FIG. 1.

In FIG. 3, the preferred embodiment is illustrated as including the first pumping chamber 18 being formed by assembling an upper head portion 120 with a lower portion 122, sealing and binding a flexible diaphragm 124 therebetween. A sealing element 127 is preferably provided to ensure a fluid-tight seal. The diaphragm 124 is preferably fabricated or coated with Teflon® or some similar non-contaminating material.

At least somewhat similarly to the aforementioned U.S. Pat. Nos. 5,167,837, 5,516,429, and 5,772,899 (especially with reference to FIGS. 2 in each of those patents), the diaphragm 124 and lower portion 122 are preferably configured to permit precisely-controlled actuation and flexing of the diaphragm (and consequent pumping of subject or process fluid) by stepper assemblies, servomotors, or similar devices displacing fluid into and from the space 125 below the diaphragm 124. In the preferred embodiment, this can be accomplished by pumping the relatively incompressible actuating fluid through tubing or passageway 126 (connected at its opposite end—not shown—to a stepper assembly 180 or its equivalent). Persons of ordinary skill in the art will understand, as indicated below, that the passageway 126 can be any suitable configuration, including (among the many alternatives) an "internal" passageway such as passage 226, shown in FIG. 13. The base elements such as base 161 are preferably fabricated from any suitably strong material, although the need for non-contamination is somewhat less because the subject fluid is not exposed to the base or any passageways therein. Positional feedback flags 184 and 194 and limit switches 182 and 192, FIGS. 1 and 2, are preferably provided on the pistons or stepper assemblies, to facilitate control and operation of the system 10. Among the many alternative embodiments of the invention (such as illustrated in FIGS. 9–14) are those using optical limit switches 282 and 292 that sense flags 284 and 294 that preferably move with the piston and extend therefrom.

Among the many alternative embodiments for the diaphragm actuating means are arrangements similar to those illustrated in the aforementioned FIGS. 2 of the aforementioned U.S. Pat. Nos. 5,167,837, 5,516,429, and 5,772,899. Integral passageways for the actuating fluid may be machined or otherwise provided in the base 161 in different directions, such as the example shown in alternative embodiment of FIGS. 12 (illustrating such a passageway 255 for actuating the slave pump) and 13 (illustrating such a passageway 226 for actuating the master pump).

The upper head portion 120 and lower portion 122 can be maintained in operative relationship with each other via a wide range of mechanisms. Preferably, a threaded nut 128 is retained on the upper head portion 120 by a retaining flange 129 seated in a groove on the exterior of the upper head portion 120, and engages corresponding threads 130 on the outside of the lower portion 122. Although the materials for the nut 128 and the lower portion 122 can be any of a wide variety, preferably they are fabricated from metal to provide a strong, repeatably engagable assembly of the head portions 120 and 122. In the preferred embodiment, the threads on elements 130 and 128 are relatively coarse, to enable correspondingly quick assembly and disassembly of the two portions 120 and 122 from each other, for servicing or other maintenance of the first pumping means 20. Large threads also are relatively easier to clean than small or fine threads.

The upper head portion 120 also preferably constitutes a monolithic element formed or fabricated from a single piece of Teflon® or similar material. As explained herein, this monolithic aspect permits various structures and elements to be incorporated directly into the head itself, which contributes to the aforementioned benefits of an improved subject fluid flow path and reduced number of potentially contaminating connections.

Figure 4:
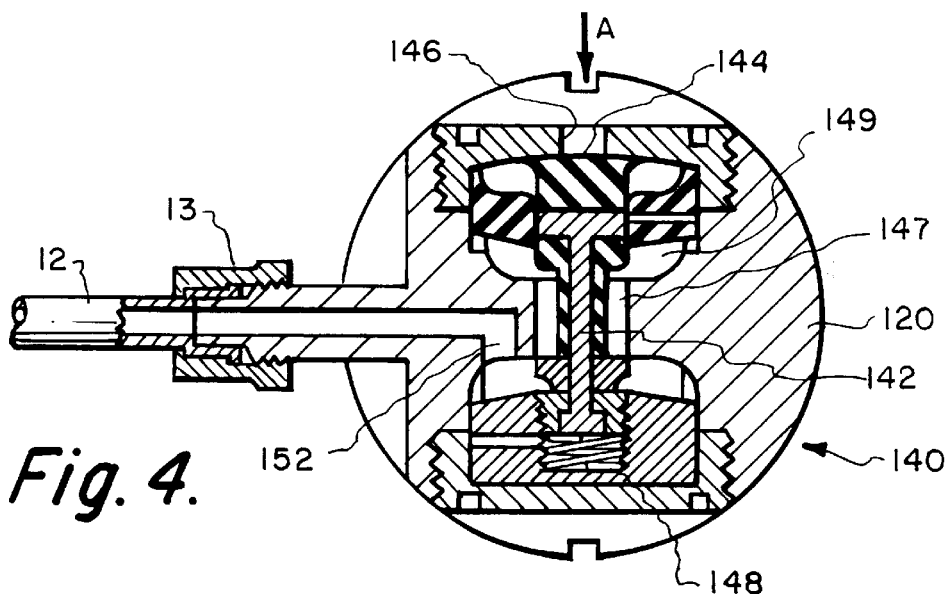
FIG. 4 is a cross-sectional view taken along line 4—4 of FIG. 3.

Among other things, the monolithic element 120 preferably includes therein an integrally formed or machined valve assembly 140 (see FIGS. 3 and 4). The valve 140 is preferably a three-way valve, permitting (as described above) selective flow (1) from a fluid source connected to inlet 12 through the valve 140 to the pumping chamber 18, and (2) from the pumping chamber 18 up through the valve 140 and subsequently through the filter 27. In the preferred embodiments, the valve means 140 includes some aspects similar to that disclosed in U.S. Pat. No. 5,261,442, but persons of ordinary skill in the art will recognize that any of a wide range of specific valve designs will suffice.

Although the preferred embodiment of the invention incorporates an integrally formed three-way valve within monolithic element 120, alternative embodiments of the invention may utilize alternative valve structures, or may not utilize any valve device. For example, one alternative embodiment may utilize a check valve, similar to check valve 49 described elsewhere herein with respect to the slave pump 30, positioned along the fluid flow path between inlet 12 and pumping chamber 18. As persons of ordinary skill in the art will appreciate, the check valve would act to permit the subject fluid to flow into pumping chamber 18, however would prevent the fluid from flowing back toward the fluid source when it is forced from the pumping chamber 18.

In any case, the preferred fluid flow passes from the pumping chamber 18 (on its "dispense" stroke) through substantially vertical passages 22 and 23 in the monolithic element 120.

Persons of ordinary skill in the art will understand that the valve 140, the passages 22 and 23, and the other elements preferably provided in the monolithic structure 120 can be formed there by any suitable means, including by machining, boring, cutting, or otherwise forming the upper head portion 120. By forming those elements integrally with the head portion 120, the material of the head portion 120 itself replaces various "connections" that were used in prior art devices, and preferably simplifies the subject fluid flow path as compared to prior art devices.

Details of the preferred valve assembly 140 are illustrated in FIG. 4, in which the subject fluid is drawn into the system through inlet 12. As indicated elsewhere herein, the fitting 13 (similar to other fittings mentioned herein) preferably comprises a non-contaminating (e.g., Teflon® or Teflon®-coated) flared fitting. Flared fittings are commonly used in the semiconductor industry. Typically, a nut such as nut 205 (FIGS. 9 and 12) is provided adjacent the eventual tubing connection, and the tube is flared outward (expanded or stretched) using a special tool or process, and is then slipped over the fitting mandrel. Tightening the nut holds the flared tubing in place in a sealing relationship.

Figure 12:
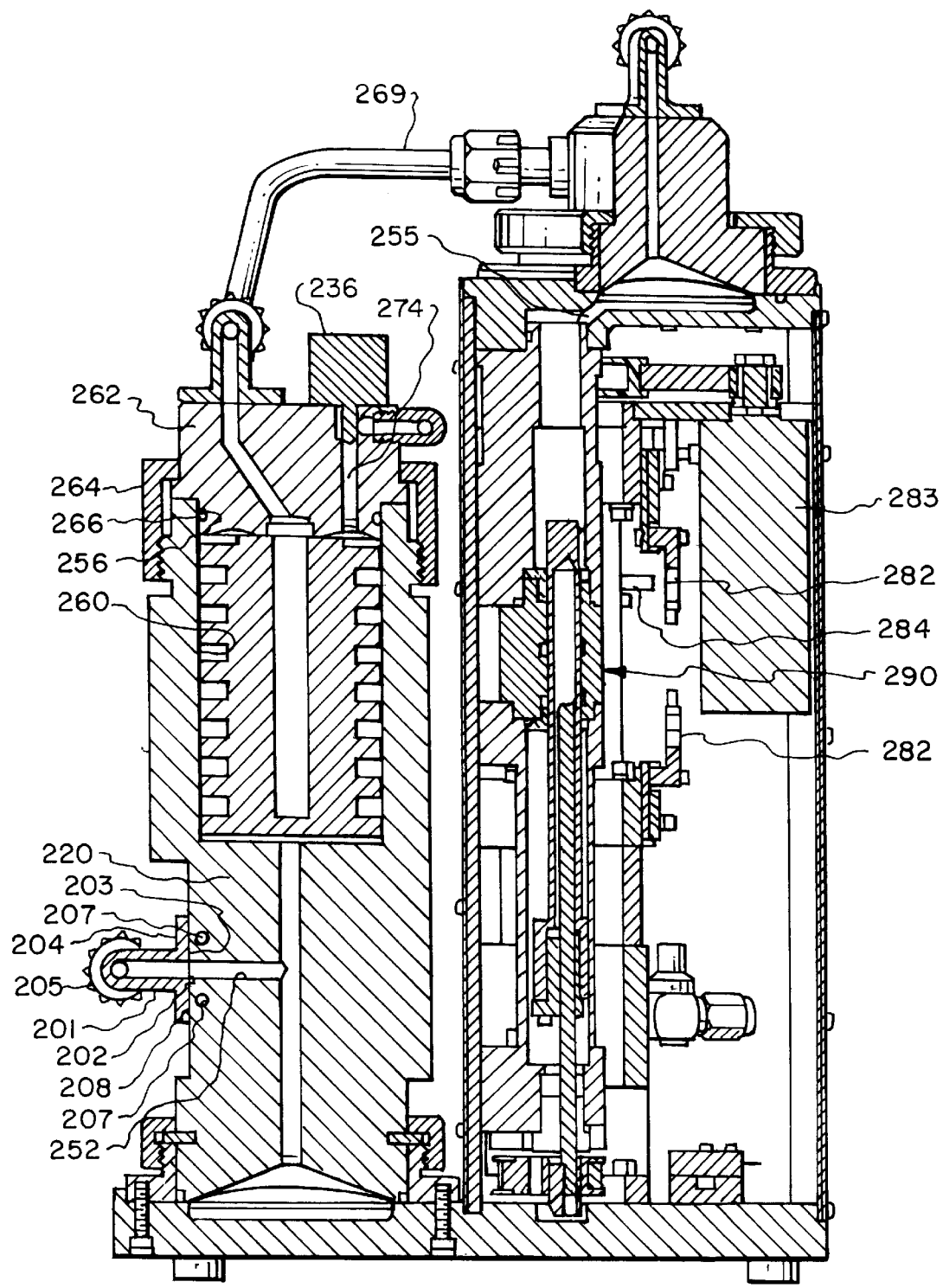
FIG. 12 is a cross-sectional view taken along line 12—12 of FIG. 11a. For the purposes of clarity, aspects of the preferred 3-way valve discussed herein have been omitted from this figure.

One of the many embodiments of this aspect of the invention is illustrated in FIG. 12, which shows a nipple 201 having a ring or tongue 202 that fits in a sealing relationship into a corresponding groove 203 on the head 220 (which head 220 corresponds to head 120 in FIG. 3). In the embodiment of FIG. 12, the nipple 201 is illustrated as integrally formed with a retaining shoulder or plate 204. Screws or bolts 206 (FIG. 9) or other methods and apparatus are used to affix the fitting to the head 220. In the preferred embodiment, the preferred Teflon material of the head 220 does not readily and reliably engage a screw's threads directly (such as would occur if screws 206 were tapped directly into the Teflon material of head 220). Accordingly, one or more rods 207 (FIG. 12) are provided in holes 208 (which holes can be "blind" or drilled through the entire head 220). Persons of ordinary skill in the art will understand that either or both ends of the holes 208 will be visible from the outside of head 220 to at least some degree (to permit boring the holes 208, inserting the rods 207, and manipulating those rods as explained below to engage the bolts 206 therewith), but may be covered, for example, by the plate 209 over the integral 3-way valve. Additional holes (not shown) are bored into the head 220 in a size and location to permit bolts 206 to be inserted into, without threadedly engaging, the Teflon head 220. The rods 207 are preferably manufactured from stainless steel, and contain cross-drilled and tapped holes to accept the screws used to secure the elbow to the lid. The end of the bolts 206 are preferably positioned to engage the cross-drilled and tapped holes provided in the rods 207, with the threads and the position of those holes in those rods 207 sized and located to correspond to the bolts 206, so that the bolts 206 can be threadedly engaged and tightened therewith. The rods 207 also preferably have one or more slots or other structure on their ends so that they can be rotated within the holes 208 by a screwdriver or the like, to help align and engage the bolts 206 with the rods 207, and thereby tighten the fitting onto the head 220.

Among the many alternative methods of attachment, it is sometimes useful to allow the nipple to be rotated or swiveled throughout a complete 360 degree rotation, especially in combination with elbow fittings attached to or formed with the nipple 201. To provide such rotatability, a split ring (not shown) or similar annular structure can be provided on the exterior of the fitting near the head 220, and a sleeve or plate similar to plate 204 can be provided to engage the split ring or shoulder. The sleeve or plate similar to plate 204 can then be engaged with the head 220 as described above, and the swivel adjustment can be performed prior to tightening the screws or bolts 206, or preferably even after the screws or bolts are tightened.

To permit the pumping chamber 18 to fill with process fluid (for subsequent pumping through the rest of the system 10), a central plunger assembly 142 of the valve 140 is depressed in the direction of arrow A in FIG. 4 (via computer-controlled air actuation, not shown, pushing on the end 144 of plunger assembly 142 through the opening 146—see the discussion below of element 246 in the alternative embodiment of FIG. 10). In the preferred embodiment, the air actuation of the plunger assembly 142 is preferably controlled by a diaphragm, but alternatively can be controlled by pistons. Indeed, an actuator (such as a separate rod or plunger, for example, not shown) or other mechanical structure can be provided to actuate the plunger assembly 144/142. In any case, the actuating pressure must overcome the spring force exerted by spring 148, and that spring 148 keeps the valve 140 in a default position of permitting flow from the pumping chamber 18 through the valve 140 to the filter 27. By depressing the plunger 142 and compressing the spring 148, fluid flow is permitted through the inlet tubing 12 through the vertical channel 22 and into the pumping chamber 18. When the pressure is released from the end 144 of the plunger 142, the spring 148 forces the plunger back into the position shown in FIG. 4, permitting the aforesaid fluid communication from the pumping chamber 18 through the valve 140 to the filter 27.

Further enabling this valve action are the preferably kidney-shaped passages 152 (shown in FIGS. 3 and 4) and 154 (shown only in FIG. 3, due to the cross section location of line 4—4). Preferably, the passage 152 opens toward the viewer as one looks at FIG. 3, while the passage 154 opens in the opposite direction (away from the viewer, or toward the "back" side of FIG. 3). The preferred kidney shapes 152 and 154 enlarge what might otherwise be a constriction in the fluid flow, improving the performance of the system 10 generally but especially with respect to processing shear-sensitive and/or high viscosity fluids. Referring to FIGS. 3 and 4, persons of ordinary skill in the art will understand that the "dispense" stroke of the first diaphragm 124 forces the subject fluid up passage 22, through the central space 147 not occupied by the plunger 142, into the annular passage 149 and thereafter into the rearward-facing kidney-shaped opening 154 and up through passage 23 to the filter 27.

For applications in which the subject fluid is to be filtered, the upper head portion also preferably includes an integrally molded or machined filter housing or chamber 160. The chamber 160 preferably includes a removable lid member 162, to permit maintenance or other access to the filter element 27. For compactness and the non-contaminating and other benefits discussed herein, the lid member 162 is also preferably manufactured or fabricated from a monolithic block of Teflon® or similar material. An O-ring or similar sealing means 166 is preferably provided between the lid member 162 and the upper body portion 120, to prevent leakage at that joint. A nut 164 (similar in concept to nut 128 at the lower exterior of the first pumping means) preferably threadedly attaches the lid member to the upper body portion 120, and is readily removable via relatively coarse threads. In order to provide an improved seal at that joint, however, and to extend the life of the joint and its components, the nut 164 is preferably also formed from polypropylene, Teflon®, or some similar plastic material. Among other things, this ensures that the life of the threads at that joint is longer than might occur if, for example, the nut were formed of metal and thereby "ate" into the corresponding Teflon® threads formed on the upper body portion 120.

In the alternative embodiment of FIGS. 9–14, the lid member 262 (corresponding to lid member 162 in FIGS. 1–8; many of the "200" series numbers in FIGS. 9–14 have a similar correspondence to the "100" numbers in FIGS. 1–8) extends downwardly into the chamber 260. The O-ring 266 can then be positioned in an outer annular channel 256, which can help prevent leakage (as compared to the "face-seal" configuration of the O-ring 166 in FIGS. 1–8) if, for example, the entire lid member 262 and nut 264 "move" vertically upwardly during pressurization of the system. The likelihood of any such movement can be affected by, among other things, the material from which the nuts 164 or 264 are formed (plastic nuts might permit more such "movement").

The filter element 27 can be any suitable filter media in any suitable configuration. Among the many suitable filters 27 are ones manufactured by Millipore Corporation, under the brand names and model numbers PI-250 Cartridge (catalog number DZUP CZI K1) and Wafergard F Cartridge (catalog number WGFG 40H P1). Preferably, the filter means is integrally positioned within the first pump 20, thus reducing the overall length of the flow path of the fluid or at least the number of connections required within the flow path. To provide the desired non-contaminating performance, the filter 27 is preferably coated or fabricated from Teflon® or similar material.

Filter 27 is preferably adapted to filter the subject fluid as it passes from the vertical passage 23 to a flow path exit passage 165 formed in the lid member 162. To ensure desired flow from vertical passage 23 into the filter chamber, the preferred embodiment includes one or more raised portions 170 (see FIGS. 3 and 5) to space the filter element 27 off the bottom of the filter chamber. In this manner the filter means 27 does not cover and block fluid flow from the top of the passage 23 into the filter chamber. In the preferred embodiment, these portions 170 are formed by "leaving" segments of the monolithic block 120 during machining of the filter chamber therein. As illustrated, four such portions 170 are equally spaced about the central opening 23, although a wide range of other suitable configurations or other elements (not shown) could be used.

Figure 5:
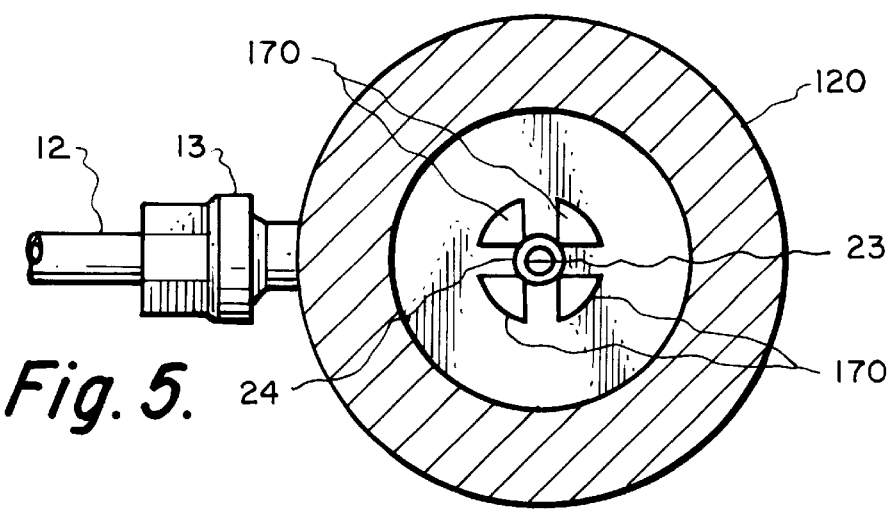
FIG. 5 is a cross-sectional view taken along line 5—5 of FIG. 3.

To further ensure desired "unrestricted" flow from vertical passage 23 into the filter chamber, the preferred embodiment also includes a countersunk or tapered portion 24 (FIGS. 3 and 5).

Figure 13:
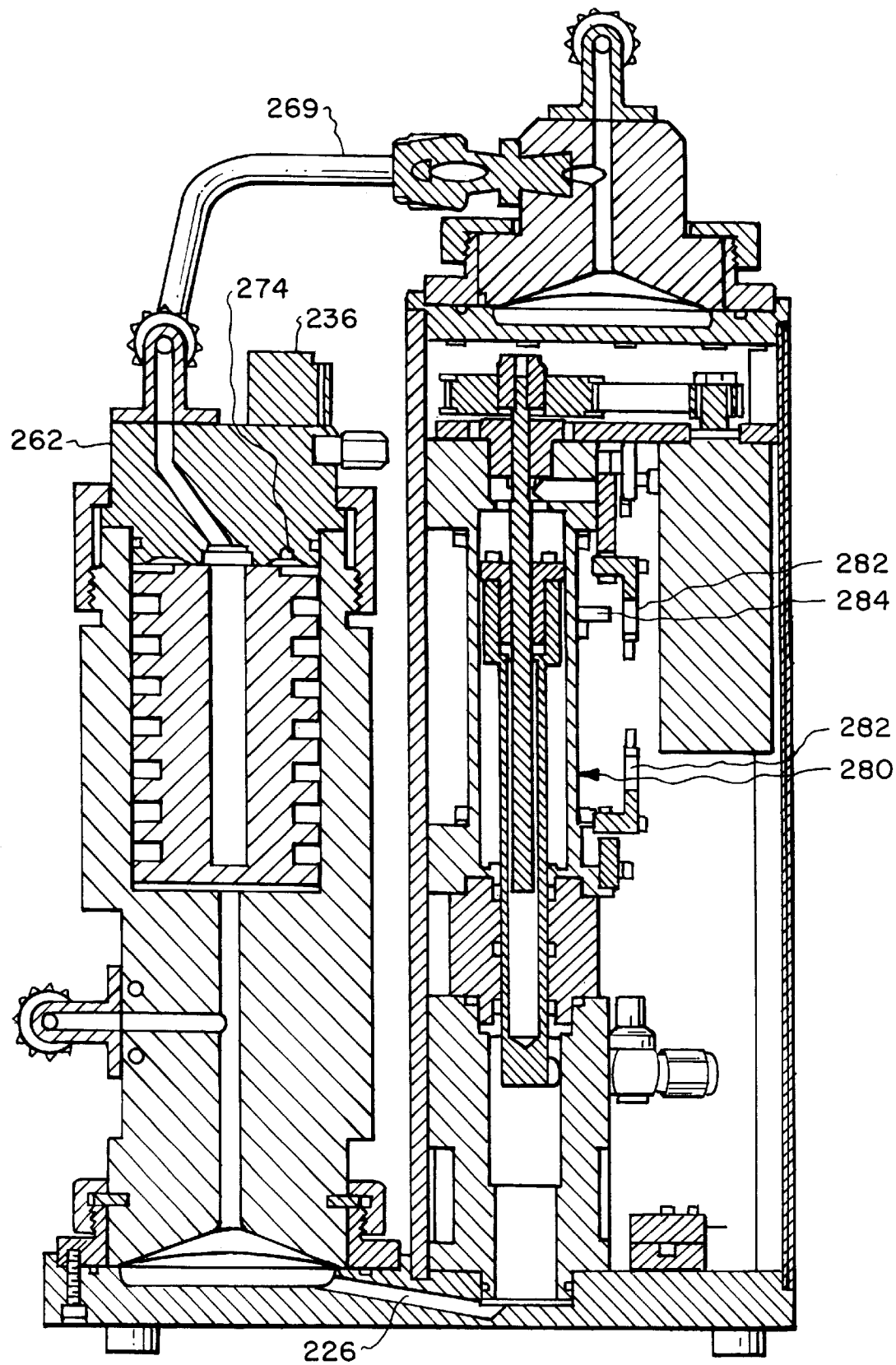
FIG. 13 is a cross-sectional view taken along line 13—13 of FIG. 11b.

As with the passages 22 and 23 in the upper body portion 120, the exit passage 165 in the lid member 162 can be formed or fabricated in any suitable manner, including drilling or similar machining. The passage 165 provides a flow path through the lid member 162 for the subject fluid, and is preferably connected to an elbow 167 (persons of ordinary skill in the art will understand that the exit flowpath can be any suitable path, but preferably does not direct the flow downwardly). Although the various fittings and other components can be assembled to each other in any suitable manner, a preferred method and structure for many of the attachments is best illustrated in FIGS. 12 and 13, and as described elsewhere herein. Among other things, those Figures illustrate preferred attachments of fittings within the system (such as elbow 167) to various Teflon components (such as the major "block" elements fabricated from Teflon). The elbow 167 is preferably connected at its other end to another Teflon® flare fitting 168 and tubing 169, and then on to the second pumping means of the system 10, as discussed elsewhere herein. Tubing 169 is preferably fabricated from or coated with Teflon® or a similar material.

Figure 6:
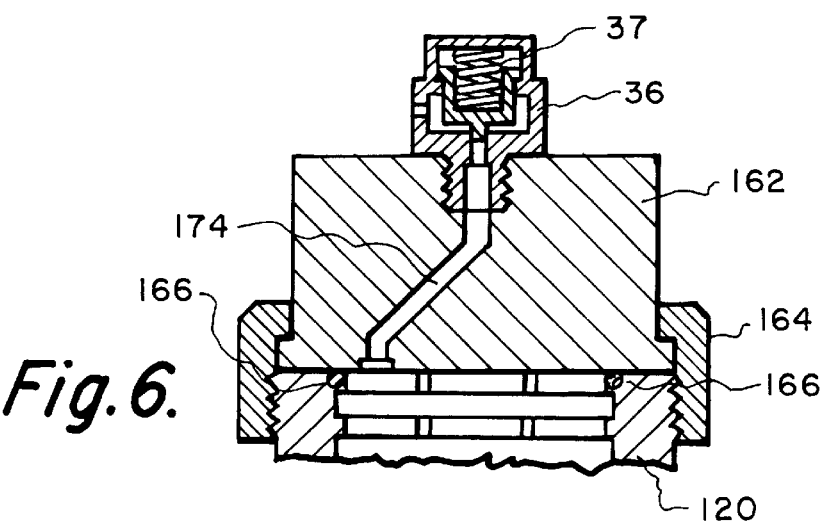
FIG. 6 is a cross-sectional view taken along line 6—6 of FIG. 1.
Figure 7:
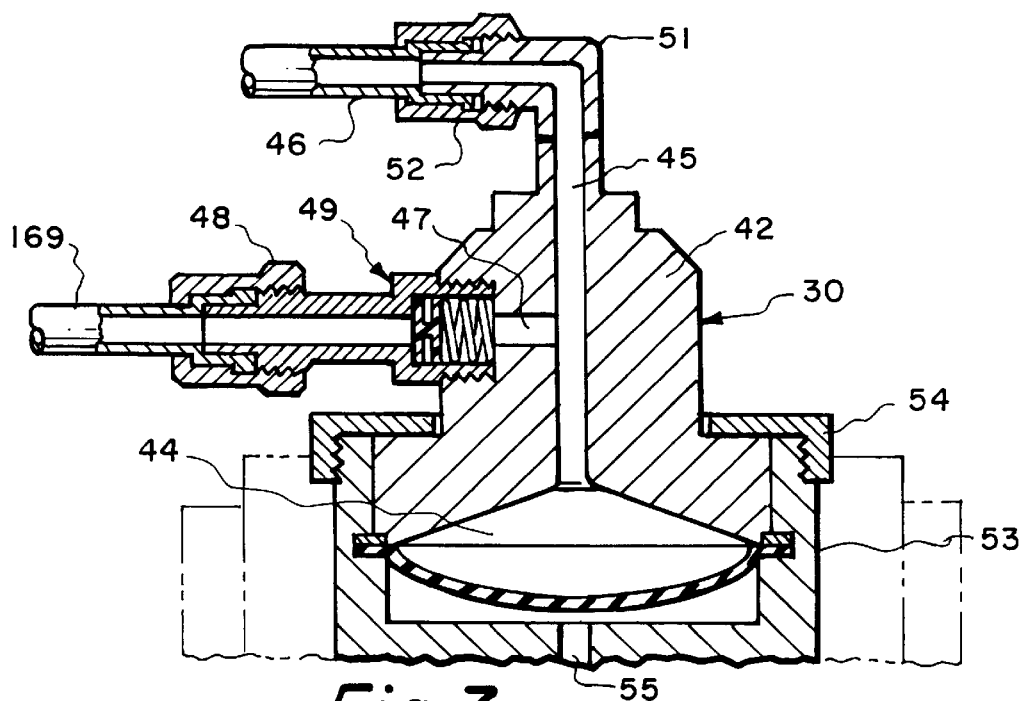
FIG. 7 is a cross-sectional view taken along line 7—7 of FIG. 1.

The lid member 162 also preferably incorporates a vent valve assembly 36, FIG. 6, operatively connected by machined passage 174 to a relatively high point in the filter chamber (corresponding alternative elements 236 and 274 are illustrated, for example, in FIGS. 12 and 13). In the preferred embodiment, the vent valve is all Teflon®, and is a two-way, normally closed valve that can be used to selectively vent gas from the process fluid. One of the many valves suitable for this purpose is manufactured by Furon Company (currently doing business at 3340 East La Palma Avenue, Anaheim, Calif. 92806, USA, which is the same Furon referred to in other parts of this description), and is illustrated in U.S. Pat. No. 5,575,311. Persons of ordinary skill in the art will understand that connecting this vent valve to a "high" point within the system permits the vent valve 36 to collect and vent undesirable gases that may be entrained within the subject fluid. Moreover, any such gas is likely to vent through passage 174 (or passage 274 in the embodiment of FIG. 12) as opposed to the more central passage 165 in the lid member 162 because the gas does not have to pass through the filter element 27 in order to get to the passage 174 (in contrast to having to do so to reach passage 165). In the preferred embodiment of the invention, the valve is automatically actuated by the pump controller and is user programmable. In addition, the valve is preferably and typically opened either during the beginning or end of the filtration cycle for a short period of time (preferably on the order of seconds). Vent 36 preferably includes a spring 37 and related adjustments by which its relief pressure can be set, enabling it to also function as a safety valve or relief valve to ensure that the pressure on the subject fluid does not exceed a certain level, or to provide relief if the filter element 27 becomes clogged, etc.

For applications in which a second pumping means is desired (for example, in applications such as some discussed in the aforementioned U.S. Pat. Nos. 5,167,837, 5,516,429, and 5,772,899), a slave or second pump member 30 (FIG. 7) is preferably provided. Many aspects of the preferred pump 30 are similar to those of the first pumping member 20 discussed above, including a pumping chamber 44 having a diaphragm therein actuated in a precisely controlled manner by a stepper assembly (not shown in FIG. 7, but illustrated in FIG. 2 as assembly 190, which can move actuating fluid through port 55) or similar mechanism.

The slave pump 30 can be positioned in a wide variety of locations with respect to the master pump 20, but is preferably sufficiently "high" that the fluid flow path trends upwardly through tubing 169 between the pumps 20 and 30. Among other things, the tubing 169 preferably at least does not travel downwardly as the fluid moves from the first pump 20 to the second pump 30, because such a downward path might entrap gas within that section of the system 10. Among the many alternative embodiments (not shown), the second pump 30 could even be positioned "directly" over the first pump 20, resulting in the tubing 169 or other passage or connection between the pumps 20 and 30 being substantially vertical (and thereby having virtually no risk of gas entrainment therein). To facilitate manufacture of the system 10, however, as well as its assembly and maintenance, the preferred embodiment positions the first pumps 20 and 30 with respect to each other as best illustrated in FIGS. 1 and 2.

The slave pump 30 preferably includes a monolithic upper portion 42 formed of Teflon® or similar material, whose monolithic nature provides similar opportunities for improved flow and reduced contamination as discussed elsewhere herein. Preferably, a tee path is drilled or otherwise machined or formed in the upper portion 42, and includes a substantially vertical passage 45 teed to another passage 47. That passage 47 preferably receives the fluid flow from tubing 169, after it passes through a preferred further Teflon® flare fitting 48 (or other non-contaminating connection) and a check valve 49 integrally mounted into the upper portion 42.

Among other things, the check valve 49 is preferably formed of Teflon® or similar non-contaminating material, and prevents the pumping/dispense stroke of the pumping chamber 44 from forcing the subject fluid back out passage 47 and toward the filter 27. Instead, the check valve 49 causes the pumping/dispense stroke of the pumping chamber 44 to force fluid further upward through passage 45 and thereafter to elbow 51 and Teflon® flare fitting 52 (the comments above regarding elbow 167 and fitting 168 on the first pumping member 20 apply with equal force to elbow 51 and fitting 52). One of the many suitable valves usable as check valve 49 is currently marketed by Furon as their part number MCV 246.

For strength and economy, the lower portion 53 of the second pumping member 30 is preferably fabricated from stainless steel, aluminum, or some other metal, and the retaining nut 54 is likewise fabricated from metal. Persons of ordinary skill in the art will understand, however, that any of a wide variety of materials can be used for those elements without departing from the scope of the invention.

As indicated above, the dispense of fluid out tubing 46 is preferably directed to yet another non-contaminating three-way valve (not shown, but graphically illustrated in FIG. 8 as element 99), by which the subject fluid can be selectively directed back to the source 60 or to be dispensed on a substrate or other microelectronic chip or device-in-process (not shown). In the preferred embodiment, the three-way valve 99 is a stand-alone valve (in contrast to the integrally-formed valve 140 within first pumping member 20) and is attached to tubing 46 and a return tubing (not shown, but illustrated in FIG. 8) via the aforementioned non-contaminating Teflon® flare fittings. The three-way valve means 99 preferably is a zero displacement valve, such that none of the subject liquid is displaced when the valve is actuated. As indicated above, and among other things, the preferred valve reduces or eliminates the likelihood that operating the valve will displace fluid (such as displacing it from the dispense line), which displacement could adversely affect the accuracy of dispense or other aspects or performance of the system.

Figure 10:
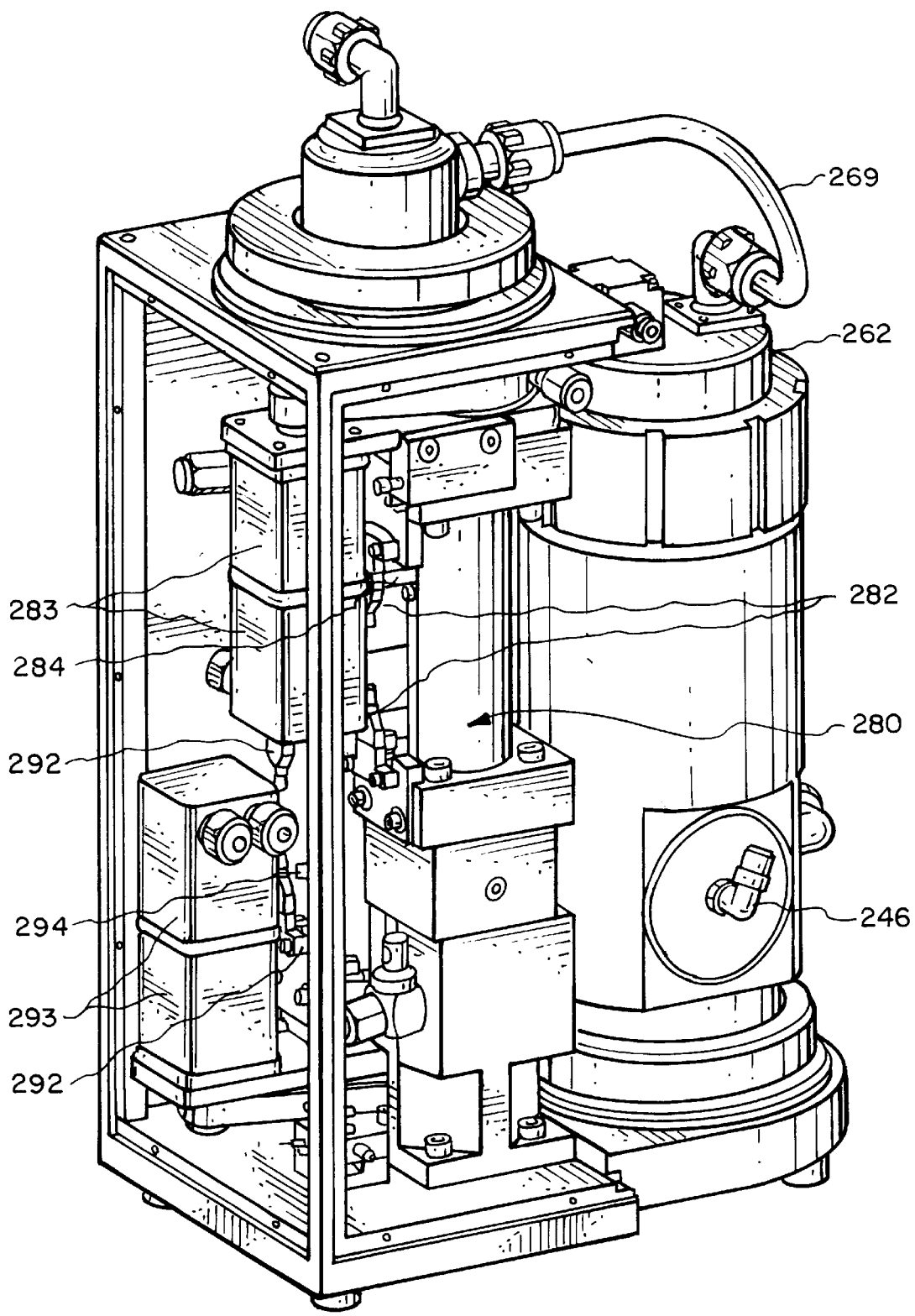
FIG. 10 is likewise similar to FIG. 2, but is an isometric view of the system of FIG. 9, viewed from an opposite upper corner as that shown in FIG. 9.
Figure 11A:
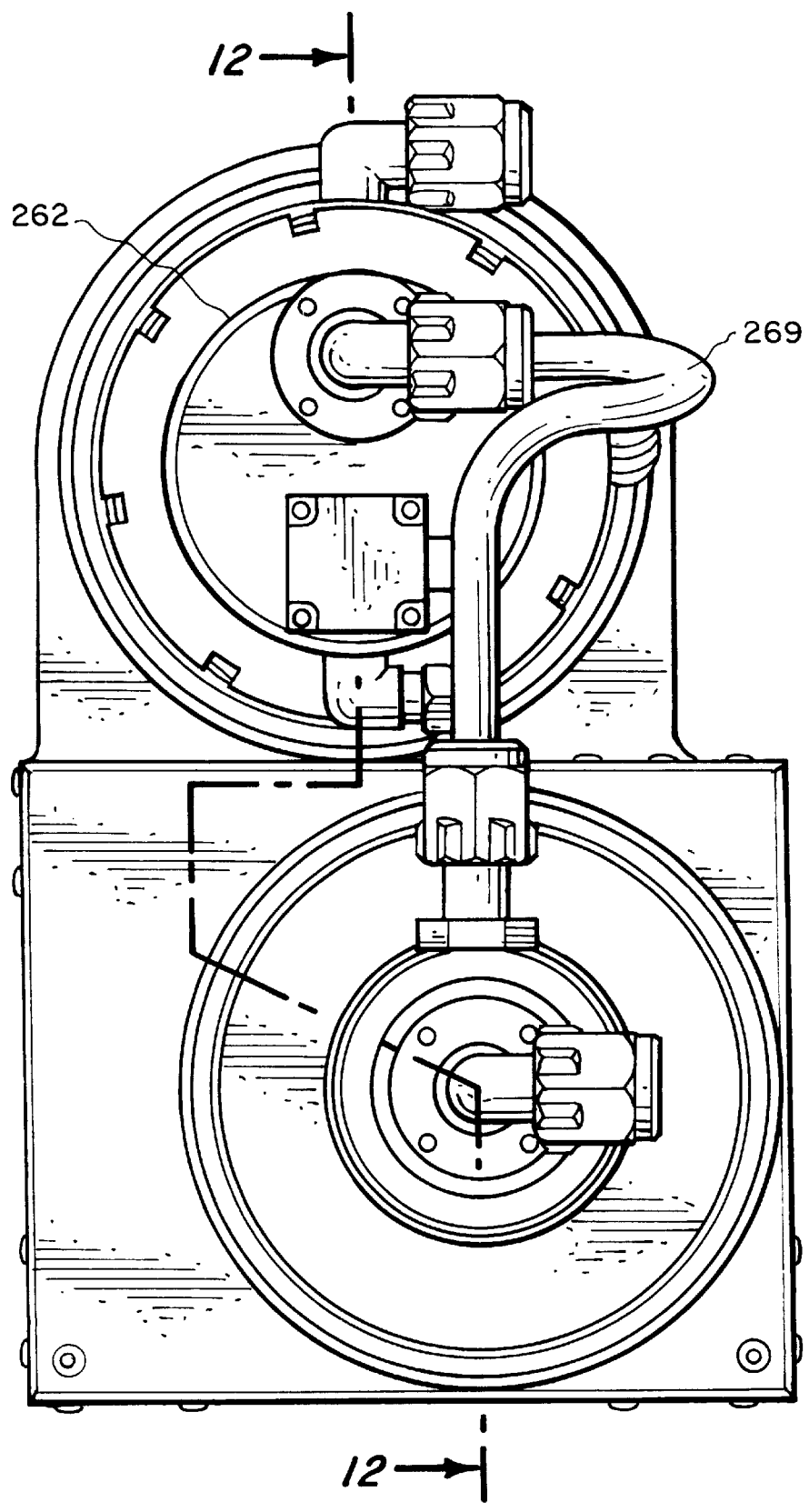
FIG. 11a is a top view of the system of FIGS. 9 and 10, except showing the inlet and outlet ports to the system facing opposite to the directions shown in FIGS. 9 and 10 (persons of ordinary skill in the art will understand that the system's fittings can be oriented in a wide range of directions and variety of positions)
Figure 11B:
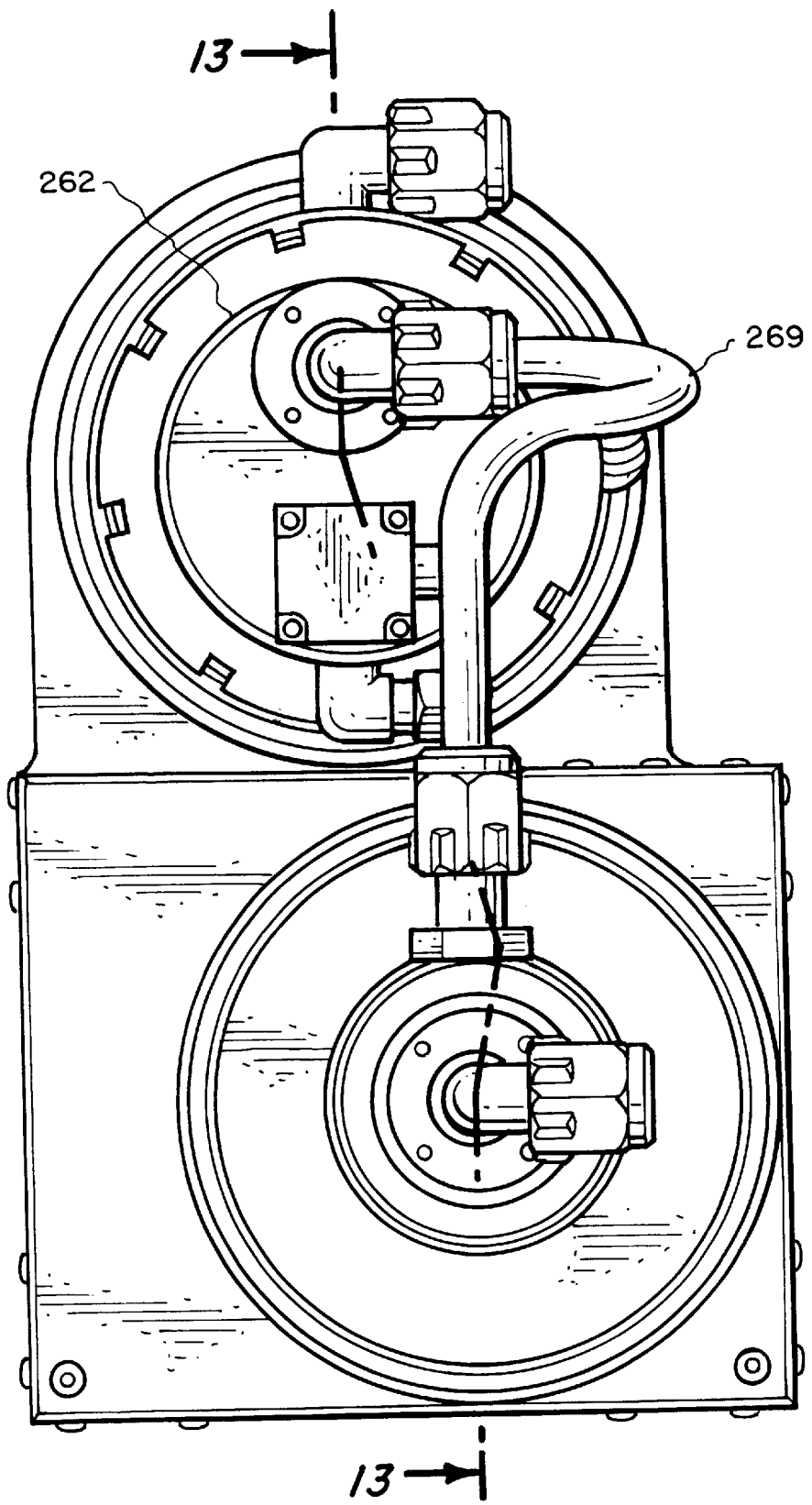
FIG. 11b is the same top view of the system of FIGS. 9 and 10 as in FIG. 11a, but includes a different section line 13—13, except, again, showing the inlet and outlet ports to the system facing opposite to the directions shown in FIGS. 9 and 10.

Persons of ordinary skill in the art will also understand that the alternative embodiment of FIGS. 9–14 includes further benefits. Among other things, the second pump 230 is slightly higher relatively to the first pump than in the embodiment of FIGS. 1–8, and the tubing 269 between the pumps is provided in an uncoiled path. The various fittings on the pumps by which the subject fluid enters and exits the pumps are redirected to facilitate use in possible alternative locations and installations. In FIG. 10, a fitting 246 is provided to facilitate the air actuation of the preferred integral three-way valve.

Figure 14:
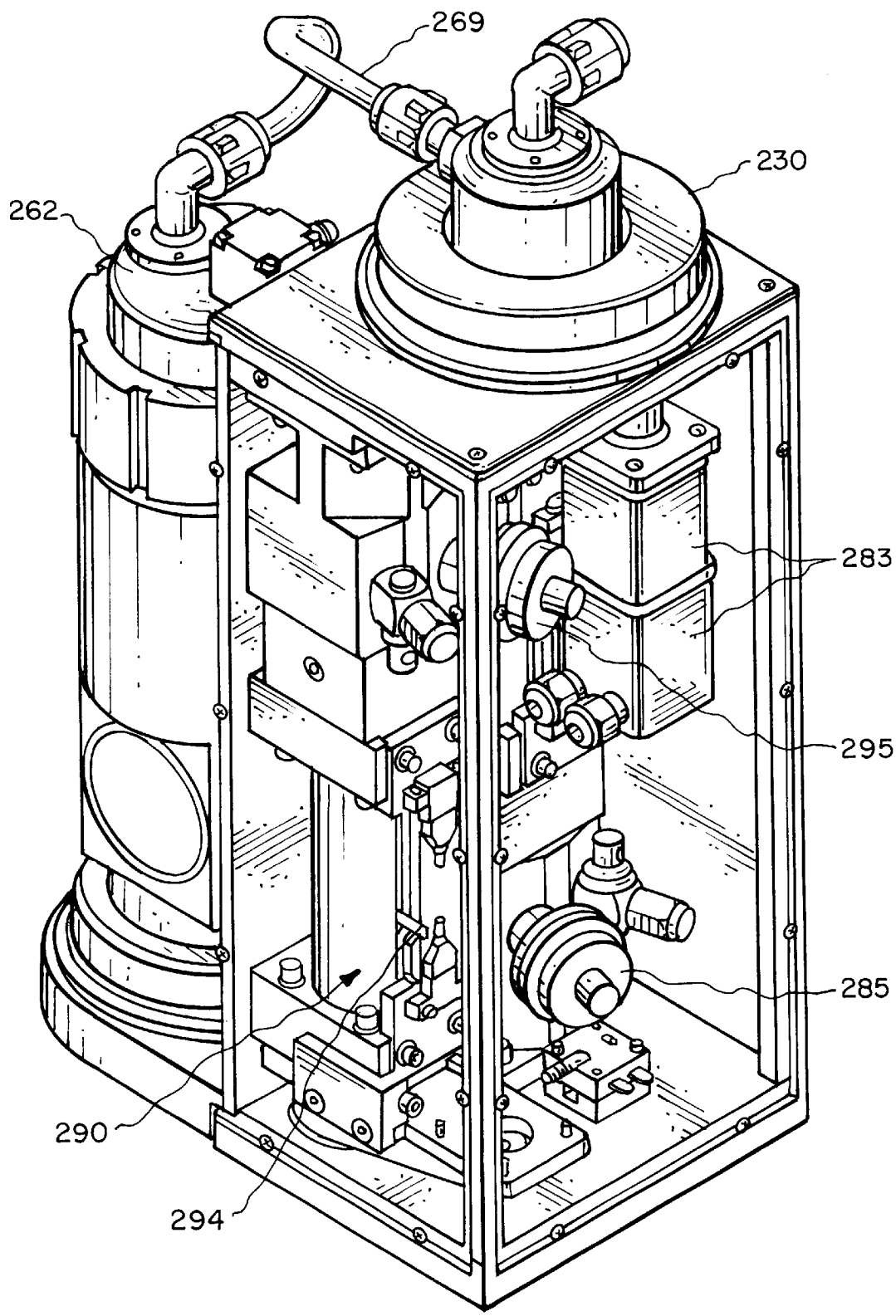
FIG. 14 is similar to FIG. 10, but is an isometric view of the system of FIG. 9 viewed from one of the remaining upper corners (other than the two shown in FIGS. 9 and 10) and, again, showing the outlet port of the system facing opposite to the direction shown in FIG. 10. Two lower units (shown as elements 293 in FIG. 10, and corresponding to upper units 283 in both FIGS. 10 and 14), which represent the servomotor assembly, are not shown in this Figure to permit better viewing of the preferred pressure transducers 285 and 295.

FIG. 14 also illustrates preferred pressure transducers 285 and 295, associated with the first and second stepper assemblies 280 and 290, respectively. Two lower units (shown as elements 293 in FIG. 10, and corresponding to upper units 283 in both FIGS. 10 and 14), represent the servo-motor assembly, but as indicated above, are not shown in FIG. 14 to permit better viewing of the transducers 285 and 295. Persons of ordinary skill in the art will understand that the transducers are configured to sense the pressure within the actuating fluid on the respective first and second stepper assemblies 280 and 290, and transmit same to a computer control mechanism (which computer control is preferably capable of sensing and operating other inputs and aspects of the assembly 10). The transducers can be utilized for a wide variety of purposes, including (without limitation): monitoring the recharge (negative) pressure; indicating the need for servicing or replacing the filter (such as by monitoring the filter pressure or differential pressure across the filter); monitoring the dispense pressure or the entire pressure cycle (which can be used for advanced process control); and other functions.

The apparatus and methods of my invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

I claim:

1. In a device for processing fluid in a precisely controlled manner, the combination of: first pumping means and second pumping means in fluid communication with each other; said first pumping means and said second pumping means providing a fluid travel path that is substantially consistently upward as the fluid flows through said first pumping means and said second pumping means, said first and said second pumping means being diaphragm pumps and actuated by incompressible fluids.

2. The device of claim 1, in which each of said first and second pumping means includes surfaces that contact the fluid, substantially all of said contacting surfaces being fabricated from or coated with a relatively non-contaminating material.

3. In a device for processing fluid in a precisely controlled manner, the combination of: first pumping means and second pumping means in fluid communication with each other; said first pumping means and said second pumping means providing a fluid travel path that is substantially consistently upward as the fluid flows through said first pumping means and said second pumping means, and further including filter means between said first pumping means and said second pumping means, in which said fluid travel path is substantially consistently upward as the fluid flows through said first pumping means, said filter means, and said second pumping means.

4. The device of claim 3, in which each of said first and second pumping means and said filter means includes surfaces that contact the fluid, substantially all of said contacting surfaces being fabricated from or coated with a relatively non-contaminating material.

5. The device of claim 1 or claim 2 or claim 3 or claim 4, in which said first pumping means includes an upper head portion removable from a lower portion, and means for temporarily attaching said upper head portion to said lower portion to form a pumping chamber therebetween, in which said upper head portion includes integrally formed valve means therein.

6. The device of claim 5, in which said valve means is configured to receive inflow of the process fluid from a source of said fluid, and is configured to thereafter direct said fluid in a substantially direct upward path toward a filter chamber integrally formed in said upper head portion.

7. The device of claim 5, in which said valve means is configured to provide a substantially direct upward flowpath for the subject fluid from said pumping chamber toward a filter chamber integrally formed in said upper head portion.

8. The device of claim 1 or claim 2 or claim 3 or claim 4 in which said second pumping means includes an upper head portion removable from a lower portion, and means for temporarily attaching said upper head portion to said lower portion to form a pumping chamber therebetween, in which said upper head portion includes an integrally formed tee therein, wherein said tee provides a substantially direct upward flowpath for the subject fluid from said pumping chamber toward a dispense from said upper head portion.

9. The device of claim 8, in which said tee includes an input portion thereof for receiving the subject fluid after it has been pumped by said first pumping means and in which said dispense from said upper head portion is positioned higher than said input portion when said device is in its normal, upright orientation.

10. The device of claim 1 or claim 2 or claim 3 or claim 4, in which said second pumping means is positioned generally above said first pumping means, and said fluid travel path from an exit of said first pumping means to an inlet into said second pumping means does not include any downwardly directed portions when said device is in its normal, upright orientation.

11. In a device for dispensing fluid, the combination of: a first diaphragm-type pump having a pumping head, said head including an integrally formed three-way valve to control flow of fluid into said first diaphragm-type pump, and a second diaphragm-type pump positioned generally above and in series with said first diaphragm-type pump to provide a fluid path that is substantially consistently upward.

12. In a device for dispensing fluid, the combination of: a first diaphragm-type pump having a pumping head, said head including an integrally formed three-way valve to control flow of fluid into said first diaphragm-type pump, and a second diaphragm-type pump positioned generally above said first diaphragm-type pump and configured to receive fluid pumped by said first diaphragm-type pump, a fluid path from said first diaphragm-type pump to said second diaphragm-type pump being generally upward.

13. The device of claim 11 or claim 12, further including a filter housing integrally formed in said first diaphragm-type pump pumping head.

14. The device of claim 13, in which said pumping head and valve provide a generally directly upward flow path for said fluid from said first diaphragm-type pump to said filter housing.

15. The device of claim 14, further including a vent valve above said filter housing to permit selective venting of any gas entrained in the subject fluid.

16. The device of claim 13, in which substantially all surfaces wetted by the subject fluid are fabricated from or coated with a relatively non-contaminating material.

17. Apparatus for filtering and dispensing fluid, the combination of: first diaphragm-type pumping means; second diaphragm-type pumping means in fluid communication with said first diaphragm-type pumping means and in series; and filtering means between said first and second pumping means, whereby said first pumping means pumps the fluid substantially vertically upwardly through said filtering means; and fluid flow means between said filtering means and a housing for said second pumping means in which said fluid travels from said filtering means to said housing for said second pumping means in a generally upward direction.

18. The apparatus of claim 17, including fittings adjacent an inlet to said first pumping means and incorporated in said fluid flow means, in which said fittings are flare fittings having wetted surfaces that are non-contaminating to the subject fluid.

19. Apparatus for filtering and dispensing fluid, including: a pump having a pumping chamber defined in part by an upper head portion, said upper head portion including a valve and filter chamber integrally formed therein, said filter chamber being disposed substantially above said valve and said filter chamber including a removable lid member forming an upper closure of said filter chamber, an outlet and vent disposed at a relatively upward location on said filter chamber; and a substantially vertical fluid pathway formed integrally in said upper head portion to permit flow from said pumping chamber to said filter chamber.

20. The apparatus of claim 19, in which said upper head portion is retained on a lower head portion by a threaded nut formed of metal.

21. The apparatus of claim 19, including an O-ring seal between said lid member and said upper head portion, in which said O-ring is positioned on the interior diameter of said upper head portion.

22. A combination of a master pump and a slave pump for dispensing fluid in cleanroom type applications, in which said master pump includes a pump head having a flow controlling valve and a filter chamber formed integrally therein, including a fluid flow path through said combination which path is comprised by materials that are non-contaminating to the subject fluid and which path flows substantially upwardly from an inlet into said master pump through said filter chamber and subsequently through said slave pump.

23. The combination of claim 22, in which said pump head and said valve therein are fabricated from Teflon®.

24. The combination of claim 23, including a vent valve positioned at a high point within said filter chamber.

25. The combination of claim 24, in which said vent valve can both vent entrained air from the subject fluid and provide pressure relief if the pumping pressure on the subject fluid exceeds a selected level.

26. A combination of a master pump and a slave pump for dispensing fluid in cleanroom type applications, in which said master pump includes a pump head having a valve and a filter chamber formed integrally therein, including a fluid flow path through said combination which path is comprised by materials that are non-contaminating to the subject fluid and which path flows substantially upwardly from an inlet into said master pump through said filter chamber and subsequently through said slave pump, and further including a vent valve positioned at a high point within said filter chamber.

27. The combination of claim 26, in which said vent valve can both vent entrained air from the subject fluid and provide pressure relief if the pumping pressure on the subject fluid exceeds a selected level.

\* \* \* \* \*